H. W. DE PUY.
Cooking Stove Cover.
No. 39,555.  Patented Aug. 18, 1863.
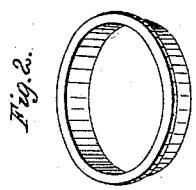
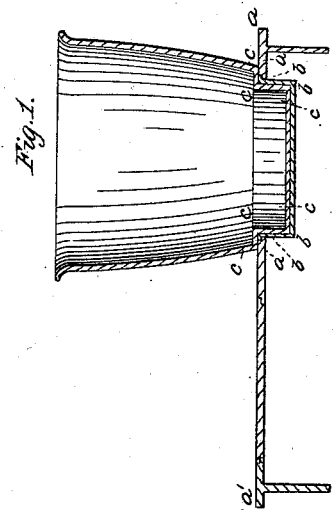
Witnesses:
Inventor:

UNITED STATES PATENT OFFICE.

HENRY W. DE PUY, OF JALAPA, NEBRASKA, ASSIGNOR TO HIMSELF AND DANIEL E. SOMES, OF WASHINGTON, DISTRICT OF COLUMBIA.

IMPROVEMENT IN COOKING-STOVE COVERS OR SHIELDS.

Specification forming part of Letters Patent No. 39,555, dated August 18, 1863.

*To all whom it may concern:*

Be it known that I, HENRY W. DE PUY, of Jalapa, in the county of Dodge, in the Territory of Nebraska, have invented a new and useful Improvement in Cooking Utensils and Apparatus; and I do hereby declare that the following is a full and exact description thereof, reference being had to the accompanying drawings, and to the letters of reference marked thereon, in which—

Figure 1 represents a sectional elevation of the top of a stove or range and a kettle with my improvement. Fig. 2 is a perspective view of a combined stove cover and shield for kettle-bottoms.

$a'$ $a$ $a$ $a'$ represent the top of the stove, to which my improvement is attached. $b$ $b$ $b$ $b$ represent my combined stove cover and shield for kettle-bottoms in position on the stove. $c$ $c$ $c$ $c$ $c$ $c$ $c$ show the interior surface of the section of a kettle. The said shield may be constructed of sheet-iron or any other suitable metal, with a rim or flange projecting around its upper edge, and having its body of sufficient depth to receive that portion of any cooking utensil which extends below the top of the stove, with its bottom and sides so adjusted as to come into contact with the corresponding portions of the cooking utensil or to be slightly separated therefrom, the shield corresponding in shape and depth to the kettle-bottom as nearly as may be convenient or desirable. When in position, the combined cover and shield is supported by the rim or flange bearing upon the upper surface of the stove or range, and a handle or bail may be so attached to it as to facilitate its removal.

The advantages of my improvement over any other hitherto invented are as follows: First, cleanliness of the cooking utensils, which, not coming in contact with the fire, remains free from soot; second, diminished weight of cooking utensils, because, not coming in contact with the fire, they may be made entirely of tin or other thin metal; third, avoiding the necessity of covering the stove to prevent the glare of the fire and the escape of the smoke whenever the cooking utensils are temporarily removed.

What I claim as new, and desire to secure by Letters Patent, is—

The combined stove cover and shield, as shown in Fig. 2, when used in connection with any cooking utensil, as and for the purpose set forth.

HENRY W. DE PUY.

Witnesses:
JAS. C. STROUT,
LYSANDER HILL.